US009317812B2

(12) United States Patent
Kabiljo et al.

(10) Patent No.: US 9,317,812 B2
(45) Date of Patent: Apr. 19, 2016

(54) CUSTOMIZED PREDICTORS FOR USER ACTIONS IN AN ONLINE SYSTEM (71) Applicants: Igor Kabiljo, Palo Alto, CA (US); Aleksandar Ilic, Palo Alto, CA (US); Ming Hua, Mountain View, CA (US); Hong Yan, Mountain View, CA (US)

(72) Inventors: Igor Kabiljo, Palo Alto, CA (US); Aleksandar Ilic, Palo Alto, CA (US); Ming Hua, Mountain View, CA (US); Hong Yan, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 491 days.

(21) Appl. No.: 13/689,969

(22) Filed: Nov. 30, 2012

(65) Prior Publication Data
US 2014/0156566 A1  Jun. 5, 2014

(51) Int. Cl.
G06N 99/00 (2010.01)
G06Q 30/02 (2012.01)
G06Q 50/00 (2012.01)

(52) U.S. Cl.
CPC .............. *G06N 99/005* (2013.01); *G06Q 30/02* (2013.01); *G06Q 50/01* (2013.01)

(58) Field of Classification Search
CPC ...... G06N 99/005; G06Q 50/01; G06Q 30/02
See application file for complete search history.

(56) References Cited

U.S. PATENT DOCUMENTS

| 4,881,178 | A * | 11/1989 | Holland et al. | 706/12 |
|---|---|---|---|---|
| 5,729,452 | A * | 3/1998 | Smith et al. | 701/31.9 |
| 8,250,008 | B1 * | 8/2012 | Cao et al. | 706/14 |
| 8,296,257 | B1 * | 10/2012 | Chavira et al. | 706/62 |
| 8,417,715 | B1 * | 4/2013 | Bruckhaus et al. | 707/758 |
| 8,438,122 | B1 * | 5/2013 | Mann et al. | 706/12 |
| 2002/0083067 | A1 * | 6/2002 | Tamayo et al. | 707/100 |
| 2003/0033587 | A1 * | 2/2003 | Ferguson et al. | 717/104 |
| 2004/0215430 | A1 * | 10/2004 | Huddleston et al. | 703/2 |
| 2005/0033709 | A1 * | 2/2005 | Meng et al. | 706/25 |
| 2006/0253458 | A1 * | 11/2006 | Dixon et al. | 707/10 |
| 2008/0249832 | A1 * | 10/2008 | Richardson et al. | 705/10 |
| 2009/0006363 | A1 | 1/2009 | Canny et al. | |
| 2009/0097711 | A1 * | 4/2009 | Chen et al. | 382/103 |
| 2009/0144609 | A1 * | 6/2009 | Liang et al. | 715/230 |
| 2010/0070436 | A1 * | 3/2010 | Gadanho et al. | 706/12 |
| 2011/0131160 | A1 * | 6/2011 | Canny et al. | 706/12 |
| 2011/0246574 | A1 * | 10/2011 | Lento et al. | 709/204 |
| 2012/0023043 | A1 | 1/2012 | Cetin et al. | |
| 2012/0174145 | A1 | 7/2012 | Frazier et al. | |
| 2012/0269116 | A1 | 10/2012 | Xing et al. | |
| 2012/0271805 | A1 | 10/2012 | Holenstein et al. | |
| 2012/0290950 | A1 * | 11/2012 | Rapaport et al. | 715/753 |
| 2012/0296845 | A1 * | 11/2012 | Andrews et al. | 705/36 R |

OTHER PUBLICATIONS

European Patent Office, Search Report, Opinion and Annex to Search Report (XP007905525), European Patent Application No. 13194355.7, Feb. 26, 2014, nine pages.
PCT International Search Report and Written Opinion, PCT Application No. PCT/US2013/072077, Mar. 24, 2014, twelve pages.

* cited by examiner

*Primary Examiner* — Jeffrey A Gaffin
*Assistant Examiner* — Thomas Fink
(74) *Attorney, Agent, or Firm* — Fenwick & West LLP (57) ABSTRACT Online systems generate predictors for predicting actions of users of the online system. The online system receives requests to generate predictor models for predicting whether a user is likely to take an action of a particular action type. The request specifies the type of action and criteria for identifying a successful instance of the action type and a failure instance of the action type. The online system collects data including successful and failure instances of the action type. The online system generates one or more predictors of different types using the generated data. The online system evaluates and compares the performance of the different predictors generated and selects a predictor based on the performance. The online system returns a handle to access the generated predictor to the requester of the predictor.

21 Claims, 7 Drawing Sheets

CUSTOMIZED PREDICTORS FOR USER ACTIONS IN AN ONLINE SYSTEM

BACKGROUND

This invention relates to predicting user actions in online systems, for example, social networking systems, and in particular to generation of customized predictors for user actions in online systems.

Online systems typically present information useful to users and allow users to interact with the online system. Online systems may use techniques to determine information that is likely to be of interest to a user before presenting the information to the user. Users are more likely to visit the online system regularly if they are presented with information they like. Online systems often earn revenue from advertisements. Advertisers prefer to advertise in online systems that are regularly visited by their users. Therefore, user loyalty may determine revenues generated using an online system. As a result, the ability of an online system to present interesting information to users typically affects the revenue earned by the online system.

Some systems determine information relevant to individual users using machine learning techniques to predict user actions. For example, if a machine learning model predicts that a user is likely to view certain content, the online system may select the content for presentation to the user instead of other content. On the other hand, if the machine learning model predicts that the user is not likely to be interested in certain information, the online system may select some other information for presenting to the user.

However, developing machine learning models requires significant effort by developers of online systems. Typically developers of machine learning models specify the machine learning technique to be used, various features relevant to the machine learning model, and provide training data for training the machine learning model. In a complex online system, developers may not be aware of the impact of various features on a predictor model. Often, developers may not even be aware of all possible features that are available in the complex system that can be used in the model. Furthermore, the impact of various features on a model can change over time. A new development in technology may affect the impact of various features on a model in unpredictable ways. For example, the users of a system may act differently if a new type of mobile technology was available, even though the new technology was not developed in conjunction with the online system. The changes in the user behavior can change the effect of various features on the model. This makes it is difficult for developers of machine learning models to develop and maintain the models, while taking into consideration all possible aspects of their own online system as well as external factors that could affect the model. As a result, conventional techniques put significant burden on the developers of machine learning models.

SUMMARY

Embodiments of the invention allow online systems to generate models for predicting actions of users of the online system. For example, an online system such as a social networking system may use a model to predict whether a user is likely to establish a connection with another user, whether a user is likely to comment on an image, or whether a user is likely to join a social group. These models are also referred to herein as predictors. The social networking system uses the predictors to select information presented to the users of the social networking system, for example, to suggest potential connections to a user, to select content presented to the user, or to recommend social groups to the user.

In an embodiment, the online system receives a request to generate a new predictor for predicting whether a user is likely to take an action of a particular action type. For example, the action type may correspond to a user liking an image, a user sending a request to connect to another user, or a user joining a social group. The request specifies the type of action and criteria for identifying a success or failure of the action type. For example, if the action type corresponds to a user sending a request to connect to another user, a successful instance of the action corresponds to the user sending a request to connect to a potential friend suggested by the online system and a failure instance corresponds to the user failing to connect to the potential friend or attempting to hide the friend suggestion. The online system collects data including success and failure instances of the action type from interactions of users with the online system over a period of time. The online system generates one or more predictors of different types using the generated data. For example, one predictor may use linear regression, another predictor may use logistic regression, and a third predictor may use the boosting tree or weighted decision tree. The online system evaluates and compares the performance of the different predictors generated and selects a predictor based on the performance. The online system returns a handle for accessing the generated predictor to the requester of the predictor. The requesting party thus receives a customized predictor for the action without having to know anything about machine learning.

In an embodiment, the online system regenerates new predictors based on new data collected by the online system to replace existing predictors. The new predictor can be a new model using an entirely different machine learning technique, or a model using the same machine learning technique but having new coefficient values used within the model. The new predictors may be periodically generated at a predetermined rate. The rate at which the new predictors are generated may be modified adaptively. For example, if performance improvement observed in a new predictor compared to an existing predictor for an action type is below a threshold value, the rate of regeneration of the predictor for that particular action type may be reduced.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment

Figure 1A:
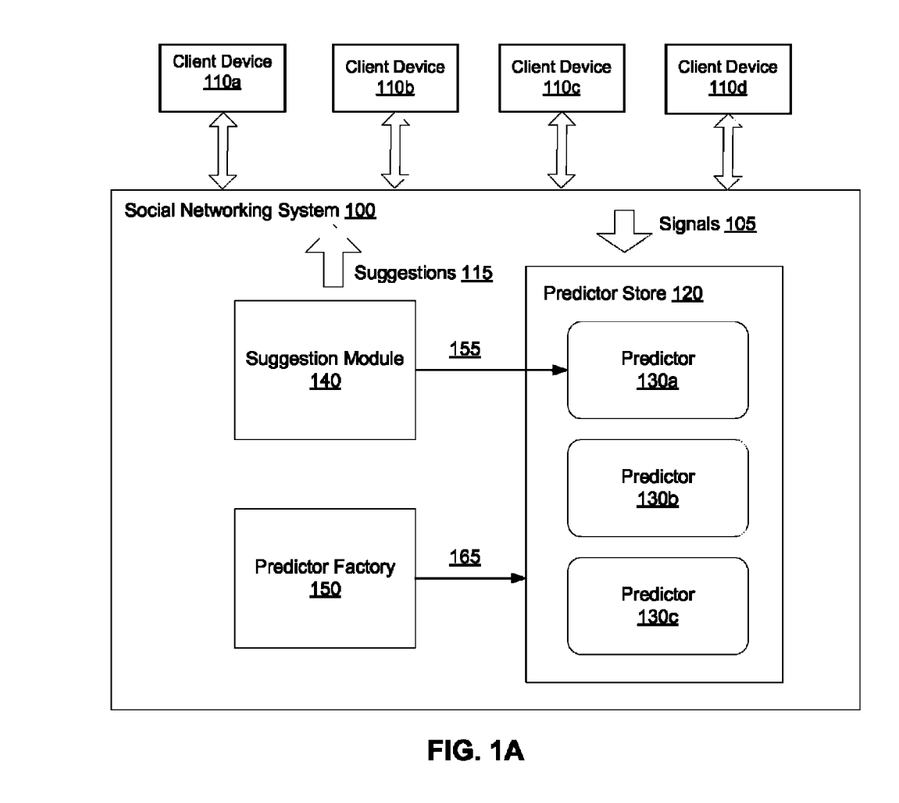
FIG. 1A is a diagram of a system environment for generating and invoking customized predictors in online systems, for example, social networking systems, in accordance with an embodiment of the invention.

FIG. 1A is a diagram of a system environment for generating and invoking customized predictors in online systems, for example, social networking systems, in accordance with an embodiment of the invention. The inventions discussed herein, although illustrated using social networking systems, are applicable to any online system that allows users to interact with the online system. Specifically, a social networking system offers its users the ability to communicate and interact with other users of the social networking system. Users join the social networking system and then add connections to a number of other users to whom they desire to be connected. As used herein, the term "friend" refers to any other user to whom a user has formed a connection, association, or relationship via the social networking system.

FIG. 1 and the other figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a" and/or "110b" in the figures).

The users interact with the social networking system 100 using client devices 110. In one embodiment, the client device 110 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 110 can be any device having computer functionality, such as a personal digital assistant (PDA), mobile telephone, smartphone, etc.

The social networking system 100 presents different type of information to the users, for example, information describing other users, social groups, social events, content, images, and so on. There are typically a large number of actions occurring in a social networking system that are associated with the user. Since a user typically has limited time to spend on the social networking system and also the amount of space available in a user interface of the social networking system is limited, the social networking system selects information that is most likely to be of interest to the user. A social networking system may incorporate one or more suggestion modules 140 that select information for presentation to the user from various available options.

The suggestion modules 140 use predictors 130 to determine whether a user is likely to perform a desired action based on information presented to the user. For example, a predictor 130 may determine a likelihood of a user requesting more information related to a newsfeed item presented to the user. Or a predictor 130 may determine the likelihood of a user commenting on an image presented to the user. Alternatively, a predictor 130 may determine a likelihood of sending a request to connect with a user suggested as a potential connection to the user. Furthermore, there can be different types of suggestion modules, each using a different set of predictors.

Embodiments of the invention allow a requester to specify the requirements for a predictor to the predictor factory 150 at a functional level rather than requiring the requester to specify the individual features to be used in the model. For example, a requester may specify the type of action for which a predictor model is required for a suggestion module 140. For example, a type of action may be a user sending a request to establish a connection with another user when presented with a list of potential connections or a type of action may be a user commenting on an image when presented with the image. The requester also specifies the criteria for identifying when the action of the specified type can be considered a success or a failure. In an embodiment, each requestor may provide a set of executable instructions that can be executed using an application programming interface (API) that gets invoked when an action of particular type occurs in a running system. The success of the action may be determined based on the calls to the API.

The predictor factory 150 uses the information provided by the requester to generate a predictor 130. Since there can be multiple requesters for a complex system, the predictor factory 150 may generate 165 several predictors 130a, 130b, 130c, and so on. The predictor factory 150 uses the signals 105 provided by the users of the social networking system 100 to train the predictor models. The signals may correspond to various actions taken by the users when they interact with the social networking system 100.

The generated predictors 130 are invoked by modules of the social networking system. For example, a suggestion module 140 may invoke 155 a predictor 130a and another module may invoke 155 predictor 130b, and so on. The modules of the social networking system, for example, the suggestion module 140 invoke 155 the appropriate predictor to determine various actions that can be taken by the modules, for example, to determine whether certain information should be presented to a particular user or whether the suggestion module 140 should make certain suggestions 115 to the user.

Figure 2A:
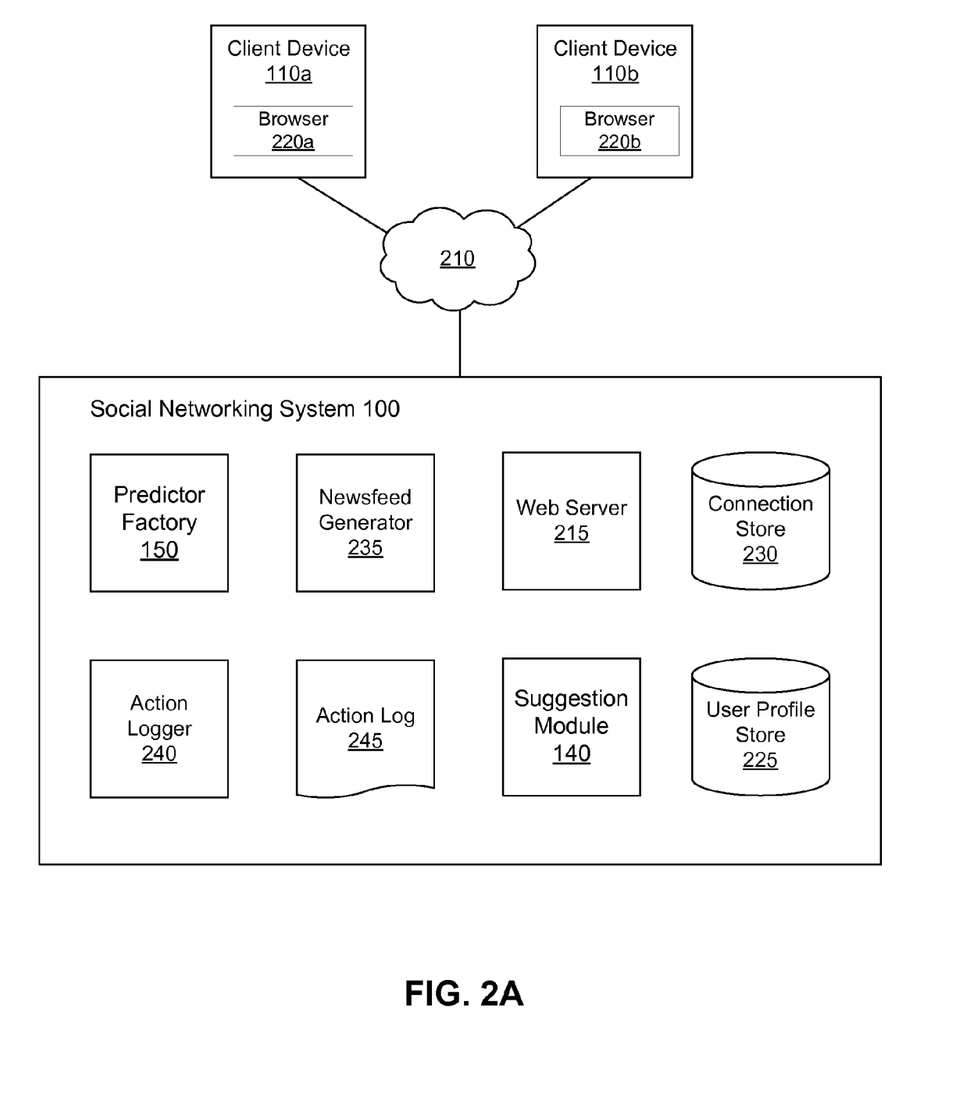
FIG. 2A illustrates the system architecture of an online system, for example, a social networking system that allows generation and invocation of predictors for specific actions taken by users, in accordance with an embodiment of the invention.

The social networking system 100 comprises software modules executing on one or more computer processors. Some embodiments of the systems 100 and 110 have different and/or other modules than the ones described herein, and the functions can be distributed among the modules in a different manner than described here. The social networking system 100 may comprise modules other than those shown in FIG. 1, for example, modules illustrated in FIG. 2 that are further described herein.

Figure 1B:
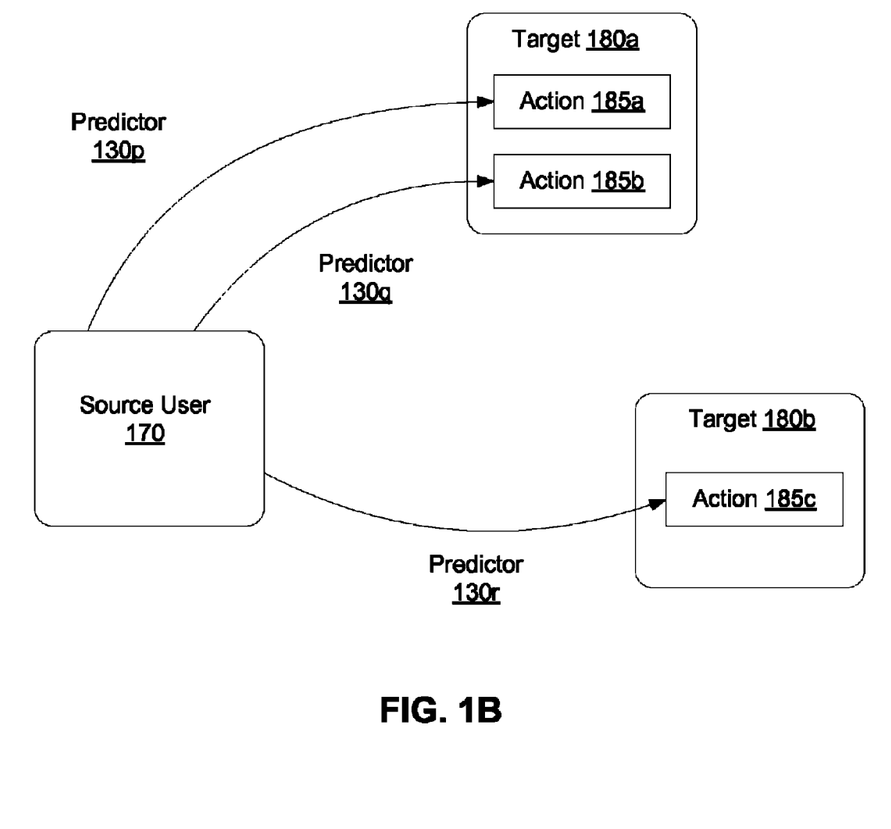
FIG. 1B is a diagram illustrating examples of predictors for specific actions taken by users, in accordance with an embodiment of the invention.

FIG. 1B is a diagram illustrating examples of predictors for specific types of actions taken by users, in accordance with an embodiment of the invention. The actions performed by a user may be with respect to a target entity. Examples of target entities include other users, social groups, images, and the like represented within the social networking system 100.

The types of actions 185 may depend on the target entity. For example, for a target entity 180 representing a social group, an action 185 may be a source user 170 joining the social group. For a target entity 180 representing a user of the social networking system, an action 185 may be the source user 170 sending a message, sending a request to establish a connection, or viewing information describing the target user 180. For a target entity 180 representing an image, an action 185 may correspond to a source user commenting on the target image, liking the target image, or viewing the target image.

The predictor factory 150 may generate a predictor model 130 for each type of action associated with a particular type of target entity. For example, predictor 130$p$ predicts actions of type 185$a$ for a target entity of type 180$a$, predictor 130$q$ predicts actions of type 185$b$ for a target entity of type 180$a$, and predictor 130$r$ predicts actions of type 185$c$ for a target entity of type 180$b$. In some embodiments, the source may be any entity represented in the social networking system that is allowed to perform an action on another target entity. The actions that an entity is allowed to perform may be different from the actions that a user is allowed to perform.

System Architecture

FIG. 2A is a diagram of system architecture of an embodiment of an online system 100 which is a social networking system 100. Although the social networking system is described herein as an example online system, the principles described herein are applicable to other online systems. The social networking system 100 includes the predictor factory 150, a newsfeed generator 235, web server 215, an action logger 240, an action log 245, a connection store 230, user profile store 225, and suggestion module 140. In other embodiments, the social networking system 100 may include additional, fewer, or different modules for various applications. Conventional components such as network interfaces, security mechanisms, load balancers, failover servers, management and network operations consoles, and the like are not shown so as to not obscure the details of the system.

The social networking system 100 stores user profiles in the user profile store 225. The user profile store 225 stores information describing the users of the social networking system 100, including biographic, demographic, and other types of descriptive information, such as work experience, educational history, gender, sexual preferences, hobbies or preferences, location, and the like. The user profile store 225 may also store content provided by the user, for example, images, videos, comments, and status updates. In an embodiment, a user of the social networking system 100 can be an organization, for example, a business, a non-profit organization, a manufacturer, a provider, and the like. The type of information stored in a user profile of an organization may be different from the information stored in a user profile of an individual. For example, an organization may store information describing the type of business, financial information associated with the organization, structure of the organization and so on.

The social networking system 100 allows users to add connections to a number of other users of the social networking system 100 to whom they desire to be connected. Connections may be added explicitly by a user, for example, the user selecting a particular other user to be a friend, or automatically created by the social networking system based on common characteristics of the user (e.g., users who are alumni of the same educational institution). Social networking systems may store information describing connections of a user along with the information specific to the user.

The social networking system 100 stores data describing one or more connections between different members in the connection store 230. The connection information may indicate members who have similar or common work experience, group memberships, hobbies, or educational history. Additionally, the social networking system 100 includes user-defined connections between different users, allowing users to specify their relationships with other users. For example, these user-defined connections allow members to generate relationships with other users that parallel the users' real-life relationships, such as friends, co-workers, partners, and so forth.

Users may select from predefined types of connections, or define their own connection types as needed. User information describing each user may include information describing connections of the user. Furthermore, information describing a connection of a user may be accessed in relation to actions performed by a user. For example, if the user posts comments on the social networking system, the social networking system may provide information describing the action to connections of the user. The information may be provided to connections of the user via newsfeed.

The action logger 240 is capable of receiving communications from the web server 214 about user actions on and/or off the social networking system 100. The action logger 240 populates the action log 245 with information about user actions to track them. Any action that a particular user takes with respect to another user is associated with each user's profile, through information maintained in a database or other data repository, such as the action log 245. Such actions may include, for example, adding a connection to the other user, sending a message to the other user, reading a message from the other user, viewing content associated with the other user, attending an event posted by another user, among others.

A social networking system 100 maintains a newsfeed channel that provides regular updates of information available in the social networking system 100 to a user. The information reported via the newsfeed channel is determined by the newsfeed generator 235. The newsfeed generator 235 generates messages for each user about information that may be relevant to the user, based on actions stored in the action log 245. These messages are called "stories"; each story is an message comprising one or a few lines of information based on one more actions in the action log that are relevant to the particular member. For example, if a connection of a user performs a transaction, the action may be reported to the user via a newsfeed story. The actions reported via the newsfeed are typically actions performed by connections of the user but are not limited to those. For example, if certain information unrelated to the connections of the user is determined to be useful to the user, the information can be reported to the user via a newsfeed.

The web server 215 links the social networking system 100 via the network 210 to one or more client devices 110; the web server 215 serves web pages, as well as other web-related content, such as Flash, XML, and so forth. The web server 215 provides the functionality of receiving and routing messages between the social networking system 100 and the client devices 110. These messages can be instant messages, queued messages (e.g., email), text and SMS (short message service) messages, or any other suitable messaging technique. In some embodiments, a message sent by a user to another can be viewed by other users of the social networking system 100, for example, by the connections of the user receiving the message. An example of a type of message that can be viewed by other users of the social networking system 100 besides the recipient of the message is a wall post. A wall post allows a user to post a message via a communication channel called wall that can be accessed by a set of users as defined by the privacy settings of the user. For example, a user can share the user's wall with all the connections of the user, with a subset of connections of the user, with all connections except a few specifically listed connections, or by a list of connections explicitly provided. In some embodiments, a user can send a private message to another user that can only be accessed by the other user.

The social networking system 100 may provide users with the ability to take actions on various types of entities supported by the website. These entities may include groups or networks (where "networks" here refer not to physical communication networks, but rather to social networks of people) to which members of the website may belong, events or calendar entries in which a member might be interested, computer-based applications that a member may use via the website, and transactions that allow members to buy, sell, auction, rent, or exchange items via the website. A user profile may store associations of a user with various entities.

The social networking system 100 may provide various mechanisms to users to communicate with each other or to obtain information that they find interesting, for example, activities that their friends are involved with, applications that their friends are installing, comments made by friends on activities of other friends etc. The mechanisms of communication between members are called channels. If a user communicates with another user, the user information of both users may have to be accessed, for example, to associate the action of communicating with the sender and the receiver.

The suggestion module 140 identifies information of interest to various users and sends the information to them. For example, the social networking system may send to a user, stories describing actions taken by other users that are connected to the user. The story may be communicated to the user via a channel of communication of the social networking system, for example, a newsfeed channel. The suggestion module 140 uses information available in the user profiles of various users to determine stories of interest to each user. The suggestion module uses predictors provided by the predictor factory 150 for selecting information for presentation to a user from different information available for presentation. The predictor factory 150 is described in the description of FIG. 1A and is described in further detail herein, for example, in FIG. 2B.

The client device 110 executes a browser 220 to allow the user to interact with the social networking system 100. The browser 220 allows the user to perform various actions using the social networking system 100. These actions include retrieving information of interest to the user, recommending content to other users, upload content to the social networking system 100, interact with other users of the social networking system, establish a connection with a user of the social networking system, and the like.

The interactions between the client devices 110 and the online system 100 are typically performed via a network 210, for example, via the internet. The network 210 enables communications between the client device 110 and the online system 100. In one embodiment, the network 210 uses standard communications technologies and/or protocols. Thus, the network 210 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 210 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 210 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 210 can also include links to other networks such as the Internet.

Figure 2B:
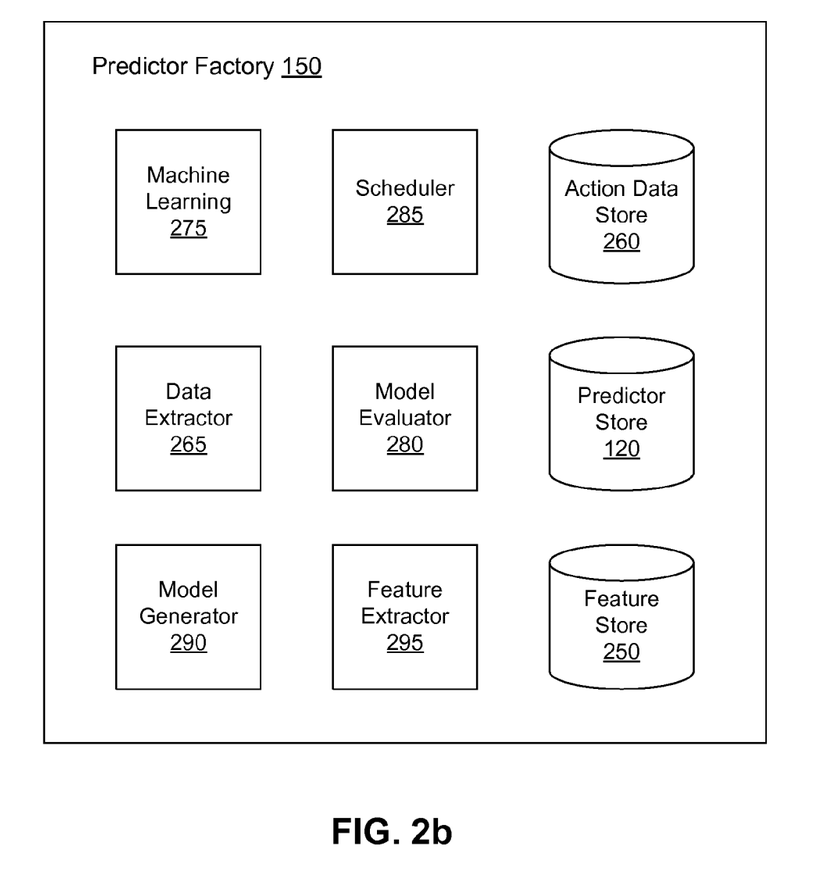
FIG. 2B is a diagram of system architecture of the predictor factory module of the online system, in accordance with an embodiment of the invention.

FIG. 2B is a diagram of system architecture of the predictor factory module 150 of the social networking system that, in accordance with an embodiment of the invention. The predictor factory 150 comprises modules including machine learning models 275, a scheduler 285, a data extractor module 265, a model evaluator 280, a model generator 290, a action data store 260, and a predictor store 120. The predictor factory module 150 receives request to generate predictors for use within the social networking system. In some embodiments, the predictors may be provided for use by external systems, for example, external systems that invoke functionality within the social networking system via application programming interfaces (APIs.)

A request for a predictor received by the predictor factory module 150 specifies a type of action to be predicted. The type of action may be associated with a particular type of entity represented within the social networking system. For example, a predictor may be requested for predicting the likelihood of a source user establishing a connection with a target user. In this situation, the action is establishing a connection and the target entity is another user. As another example, a predictor may be requested for predicting the likelihood of a source user joining a social group. In this example, the action is a user joining a social group and the target entity is a social group.

The request also specifies criteria for identifying successful instances of the action and criteria for identifying failure instances of the action type. For example, if the action type corresponds to a user sending a request to connect to another user, a successful instance of the action corresponds to the user sending a request to connect to a potential friend suggested by the online system and a failure instance corresponds to the user failing to connect to the potential friend or attempting to hide the friend suggestion. The criteria for identifying successful instance may comprise information indicating an appropriate user interface presented to the user and information indicating a type of action performed by the user using the user interface. For example, a success of a user attempting to establish a connection with another user may be identified by detecting that a user interface suggesting potential connections of the user was presented to the user, and the fact that the user provided input via the user interface indicating that the user wants to connect to one of the suggested connections.

Failure instances of certain types of actions may also correspond to a user providing a negative feedback, for example, by requesting the social networking system to hide certain information presented to the user. As an example, the social networking system 100 may recommend certain content to the user along with user interface allowing the user to provide feedback regarding the content. The user may use the user interface to provide feedback that may be positive or negative. A negative feedback may correspond to a user indicating via the user interface that the user dislikes the information presented, the user attempts to hide the information presented, or indicates that the user does not want to see that particular type of information or information from that particular source any more.

A failure of an action of the same type may be identified by detecting that the user interface suggesting potential connections of the user was presented to the user, and no input was received from the user attempting to establish a connection with the suggested user(s). The lack of input received from the user may be detected by not receiving any input attempting to establish a connection for more than a threshold time interval or when a new user interface is presented replacing the previous user interface or a new list of potential connections is presented to the user. A failure may also be identified if the user provides an explicit or implicit negative signal, for example, the user indicating that the user wants to hide the information describing the suggested user, or the user indicates that the user does not wish to see the user interface. The actions may be detected at run time, for example, by the action logger, or by processing actions in the social networking system offline, for example, by analyzing the action log.

The data extractor module 265 analyzes information available in the social networking system to extract data useful for training, evaluating, or testing a predictor model. For example, if a module requests the predictor factory to provide a predictor model for a particular type of action, the data extractor module 265 extracts instances of that type of action. The data extractor 265 may collect data for the given type of action by analyzing data available in action logs 245. For example, the data extractor 265 may look for various instances of the given type of action in the action logs.

As an example, if the action corresponds to a user commenting on a photo, a successful instance of the action is corresponds to a particular user commenting on a photo when presented with the photo and a failure instance corresponds to the user not commenting on the photo in spite of being presented with the photo. Similarly, if an action corresponds to a user requesting additional information for a newsfeed item, a successful instance corresponds to a particular user requesting additional information when presented with the newsfeed item and a failure instance corresponds to the user not requesting additional information responsive to being presented with a particular newsfeed item. The data extractor 265 identifies both successful and failure instances of the action wherein a positive successful corresponds to the user performing the action and the failure instance is the user not performing the action given the appropriate opportunity to perform the action.

If the requesting module specifies that the predictor model is requested for a particular category of users, the data extractor 265 generates data based on actions taken by users belonging to that category. A requester module may request a predictor model for users having a particular demographic characteristic, for example, users that have male gender and belong to a particular age group, users that have female gender and have a particular economic status, users belonging to a particular geographic region, users that have a particular ethnic background, or users that speak a particular language.

In an embodiment, the data extractor 265 invokes modules of the social networking system to present selected users with opportunities to perform the particular type of action and monitors whether the selected users perform the action. If the selected user performs the action given the opportunity, the data extractor 265 logs a positive instance of the action type. If the selected user does not perform the action given the opportunity, the data extractor 265 logs a negative instance of the action type. The positive instance of an action is also called a success and a negative instance is called a failure of the particular action.

The data extractor 265 may store the extracted data in the action data store 260. The information stored in the action data store 260 describes various actions taken by users that are relevant to either generating predictor models or testing and evaluating a predictor models. The table 1 shows an example data values stored in the action data store 260 for a given type of action.

TABLE 1

| Row ID | Source ID | Target ID | Target Type | Action ID | Label |
|---|---|---|---|---|---|
| 1001 | 100 | 200 | User | 25 | 1 |
| 1002 | 100 | 201 | Group | 35 | 0 |
| 1003 | 101 | 202 | Image | 65 | 1 |

As illustrated in table 1, each row of data has a data row ID value that represents a row identifier that uniquely identifies the row. The source ID is an identifier that uniquely identifies the source of the action, for example, a user that performs or does not perform an action. The target ID represents an identifier value representing the entity on which the action is performed. The target type represents the type of entity corresponding to the target. The target can be any type of entity represented in the social networking system, for example, a group, a user, an image, an application, a comment, a newsfeed item, and the like. Typically targets are entities with which source users can interact. A source user performs an action corresponding to an interaction with the target entity. Each type of action may be represented by a unique identifier. The action ID value stores the identifier corresponding to the type of action that the row represents. For example, if the target entity is an image and the action may be commenting on the image, or if the target entity is a user, the action may correspond to the source user sending a request to establish a connection with the target user. In another embodiment, the action data store 260 stores a single row if the action is repeated by the user multiple times within a short time interval. For example, if a user retrieves information describing another user multiple times in a short time interval, or the user repeatedly hits a like button for an entity multiple times within a short time interval, a single row is stored for all these instances of the action type between the same source and target. In an embodiment, the action data store 260 stores a count for each row of the table I such that the count indicates a number of instances of a particular type of action by the same user against the same target entity within a past time interval of a predetermined size, for example, an interval of 30 minutes.

The label column indicates whether the row corresponds to a positive instance or a negative instance, for example, a value of 1 indicates a positive instance of the action and a value of 0 indicates a negative instance of the action. In the example data illustrated in table I, the user with ID 100 is associated with two instances of the action, one corresponding to the row 1001 which is targeted at an entity with target ID 200 and another instance corresponding to the row 1002 which is targeted at an entity with target ID 201. The third row corresponds to an instance of the action taken by another user with source ID 101. In some embodiments, the label can occupy values other than zeros and ones, for example, the label can represent a value of a counter that can take any positive integer value.

Based on the events collected in the table T1, the feature extractor 295 extracts features based on the available actions. Examples of features include information characterizing the source user and the target entity as well as relationship between the source and target. For example, if the target entity is a user, a feature may indicate a rate at which the source user has communicated with the target user in the past, the rate at which the target user has accessed information describing the target user, the length of time since the last interaction between the source and target users, and so on.

A feature may be represented as an expression based on values associated with entities represented in the social networking system 100 and actions performed in the social networking system 100. These expressions representing features can be provided by experts and added to the system by a privileged user, for example, a system administrator. In an embodiment, a feature is represented as a function of actions logged in the social networking system, i.e., feature=function (logged_actions). A feature could also be a function of other features, for example, an expression based on other features or actions, or combinations of the two. As an example of a feature as an expression, if the target is a user, and view_profile corresponds to the source user viewing the target user's profile, view_photo corresponds to the source user viewing the target users photo, and view_comment corresponds to the source user viewing a comment posted by the target user, a feature called observation may be defined as follows.

$$observation = view\_profile + view\_photo + 0.5 \times view\_comment$$

In an embodiment, in the above equation, a value of a term, say view_profile is 1 if the action occurs and 0 if the action doesn't occur. In another embodiment, the value of each term may be a score value, for example, a score based on information describing the particular action, for example, the number of times the action is performed by the user within a time interval, or the length of time associated with the action such as a length of time that a user observes a photo before retrieving a different photo.

In an embodiment, a feature can be an aggregate value based on actions performed by the source user with respect to multiple targets. For example, a feature may represent an aggregate of all page views performed by a source user in a given time interval for all other users connected to the source user. Another feature may represent the rate at which a user views images posted by other users connected to the user. A feature may represent an action performed by a source user with respect to a target user that is normalized based on the source user's behavior with respect to all other users connected to the source user. For example, a feature may represent how often a source user interacts with a target user normalized using the average number of interactions of the source user with other users connected to the source user. The metadata describing the various features is stored in the feature store 250.

In an embodiment, the data representation of table I can be a database table in the action data store 260. The actions as they take place in the social networking system are added to the data representation of table I. Also, the features that are based on a type of action are updated as an instance of the action is added. For example, if a feature is based on the number of times a user viewed a photo, each instance of the user viewing the photo may cause the feature to be re-evaluated. In an embodiment, a features table stores the values of various features. For example, the features table may have columns source ID, target ID, type of target, action ID, and various features.

In an embodiment, the action data store 260 maintains a feedback table that stores the training data required for training different predictor models. Each predictor model may be associated with a call site representing the context in which the predictor model is invoked or used. The same type of action may be performed by a user in different contexts. A context may be associated with a particular presentation of information to the target user in which the user can take that action. As an example, the action of a user sending a request to connect with another user may be performed in different contexts each associated with a type of user interface. For example, a user may send a request to connect to another user when presented with a list of potential connections of the user. Alternatively, the source user may be presented with an opportunity to connect with a target user when the source user is viewing an image or other information describing the target user. Table II shows columns including a source ID, a target ID, a call site and a label representing whether the action instance is a success or a failure. The information presented in table II can be used to train the different predictor models.

TABLE II

| Row ID | Source ID | Target ID | Label | Call Site |
|--------|-----------|-----------|-------|-----------|
| 2001   | 100       | 200       | 1     | C1        |
| 2002   | 100       | 201       | 0     | C2        |
| 2003   | 101       | 202       | 1     | C3        |

In an embodiment, the values for various features may be represented as name value pairs associated with each instance of source and target. In another embodiment, the data generated for a particular predictor model is represented as table III in which each source and target is associated with various features that are relevant to the model. The table III also stores the label representing a success or failure for each row.

TABLE III

| Row ID | Source ID | Target ID | Label | Feature F1 | Feature F2 |
|--------|-----------|-----------|-------|------------|------------|
| 2001   | 100       | 200       | 1     | 20         | 512        |
| 2002   | 100       | 201       | 0     | 20         | 630        |
| 2003   | 101       | 202       | 1     | 15         | 720        |

The data stored in a representation of table III can be divided into different parts for different types of usage related to a particular predictor model. For example, one part of the data can be used for training, another part can be used for testing different types of machine learning models, and a third part can be used for evaluating the different machine learning models, for example, to compare different types of models to select a particular type of model for a given call site.

The machine learning module 275 implements various types of models that can be tried for each given action type. Examples of different types of machine learning models implemented by the machine learning models 275 include linear regression, logistic regression, quadratic regression, power regression, exponential regression, boosting tree, weighted decision tree, as well as other types of models that are appropriate. Each model may be associated with certain coefficient values. For example a linear regression model may be represented as $w1*f1+w2*f2+w3*f3+ \ldots$ where each feature fi is weighted by an appropriate coefficient wi.

The model evaluator 280 evaluates each predictor model based on the data collected for the model, for example, using log-loss scoring. The model evaluator 280 may predict results using a given model and compare the predicted results with actual results observed. In an embodiment, the model evaluator evaluates 280 a model by comparing the result predicted by the model against a random guess. In an embodiment, the model evaluator 280 evaluates the performance all various types of models and compares their performance against each other so as to select the best performing model to be used as the predictor model for the given call site. The model evaluator 280 also compares the selected model against the existing model if available to determine whether to replace the existing model with the new model. If two different models are compared, they are evaluated against the same data set and the results compared.

The scheduler 285 schedules tasks for regenerating predictor models based on a predetermined schedule. The schedule for each predictor model for a particular action may be different. In an embodiment, the scheduler 285 maintains a queue of tasks. Each task identifies a predictor model for a particular type of action and one or more timestamp values corresponding to the time when the predictor model is regenerated. At a given time corresponding to a timestamp, the scheduler selects the task and invokes the appropriate modules to execute the task. The regeneration of a predictor model may correspond to recalculating the various coefficients for the model. Accordingly, the existing predictor model may be retained but the coefficients of the particular model are changed. For example, if the existing predictor model is linear regression model, the new predictor model may also be a linear regression model with the coefficients for the various terms of the model replaced with new coefficients. The regeneration of a predictor model may correspond to regenerating a new model. For example, a model of a new type may be generated to replace the existing predictor model. In some situations, the existing predictor model may be retained if the new predictor model is not significantly better than the existing model or worse than the existing model.

Overall Process

Figure 3:
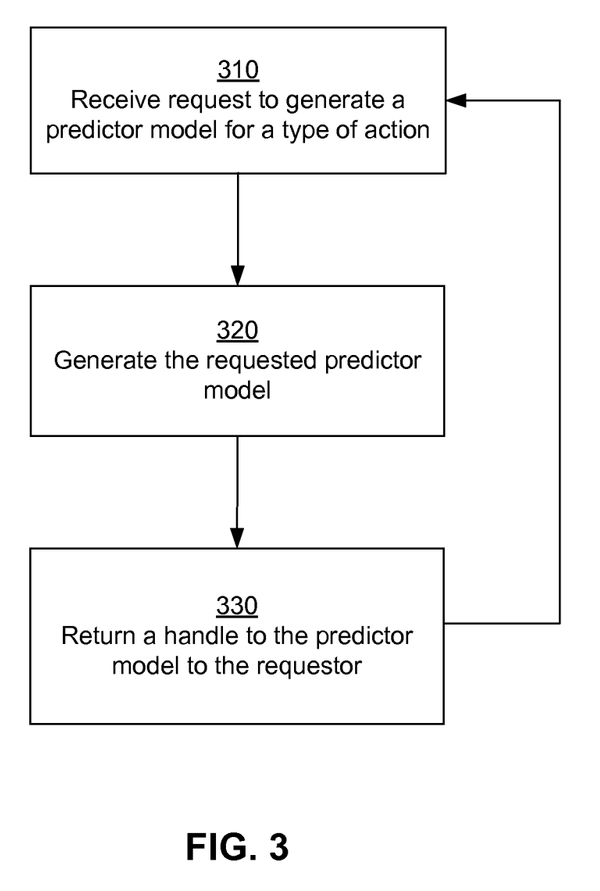
FIG. 3 illustrates the overall process for generating predictor models for use by various modules in the social networking system, in accordance with an embodiment of the invention.

FIG. 3 illustrates the overall process for generating predictor functions for invocation by various modules in the social networking system, in accordance with an embodiment of the invention. Various modules of the social networking system 100 can be consumers of predictor models generated by the predictor factory 150. For example, the newsfeed generator 235 may invoke a predictor model that predicts the likelihood of a target user being interested in viewing content sent to the target user via newsfeed. A suggestion module 140 may invoke a predictor model that predicts the likelihood of a user interacting with a group suggested to the user, for example, the likelihood of the user requesting further information describing the group or the likelihood of the user becoming a member of the group.

The predictor factory 150 receives requests 310 for generating predictor models for certain type of user action for use by other modules of the social networking system 100. As described above the request may be for a predictor model for certain type of action that a target user is likely to take, for example, request information describing another user, establish a connection with a user, write a comment on a photo, become member of a group, and so on. The request provides a metric for determining a success corresponding to the action and metric for determining a failure corresponding to the action. The success of the action corresponds to criteria that can be used to determine whether, given an opportunity to perform an action of a given type to a user, the user performs an instance of the given action type. The failure of an action corresponds to criteria that can be used to determine whether, given an opportunity to perform an action of a given type to a user, the user does not perform the action of the given action type. The failure of an action can be determined based on the fact that the action is never performed until the opportunity to perform the action is removed. This may happen when a new set of information is presented to the user that may correspond to an opportunity to perform a different action, thereby overwriting the information corresponding to the previous action. Alternatively, the failure of an action can be determined based on active feedback from the user, for example, a signal from the user indicating that the user does not want to view the information presented any more, or the user dislikes the information presented. Since the user is indicating to the social networking system that the information should be removed, the user is unlikely to perform the action based on the information presented, thereby indicating a failure of the action.

As an example, if the action corresponds to a user requesting additional information from a newsfeed presented to the user, the success of the action may correspond to the user clicking on the newsfeed item to request additional information. Similarly, for this example, a failure may correspond to the user either attempting to hide the newsfeed item, the user indicating a dislike for the newsfeed item, or the user not clicking on the newsfeed item after the newsfeed item is presented to the user.

In an embodiment, the requester may also specify a category of users for whom the predictor model is requested. The requested predictor model may be targeted to users having certain demographic characteristics. For example, the requested predictor model may determine a likelihood of women in a certain age group becoming a member of an organization represented in the social networking system or a likelihood of males from a particular geographic region being interested in certain media content.

The model generator 290 generates 320 the requested predictor model. The details of how the model generator 290 generates 320 the requested predictor model are further described herein, for example, in the flowchart illustrated in FIG. 4. The predictor model may comprise executable code that can be invoked along with certain parameters or attributes associated with the executable code. For example, the executable code for the predictor model may be a machine learning model and the parameters for the predictor model may be coefficients used by the machine learning model. The predictor model stores the information describing the generated predictor model in the predictor store 120.

The predictor factory 150 also generates a handle for the generated predictor model. The handle can be any value that is used to uniquely identify the predictor model. The handle may be a function, a function name or a pointer used to invoke the predictor. The predictor factory may maintain a table mapping handlers to predictor models for looking up a predictor model given a handler. The handle may comprise a numeric identifier, a string, a function pointer identifying the predictor model, or a name of a function or method implementing the predictor model. The handle also comprises information identifying coefficient values corresponding to the predictor model, for example, coefficient values used by a machine learning technique.

The predictor factory 150 returns 330 the handle to the requester module. The requester module can use the handle to subsequently invoke the predictor model. The requester module may provide the handle for a predictor model along with parameters for a specific a specific invocation of the predictor model. For example, the suggestion module may invoke a predictor model by providing the handle to the generated predictor model to the predictor factory along with information identifying a particular user and a group to predict the likelihood of the user requesting information describing the group. The steps of the process illustrated in FIG. 3 may be repeated for new requests, for example, requests for predictor models for use in other modules of the social networking system.

Figure 4:
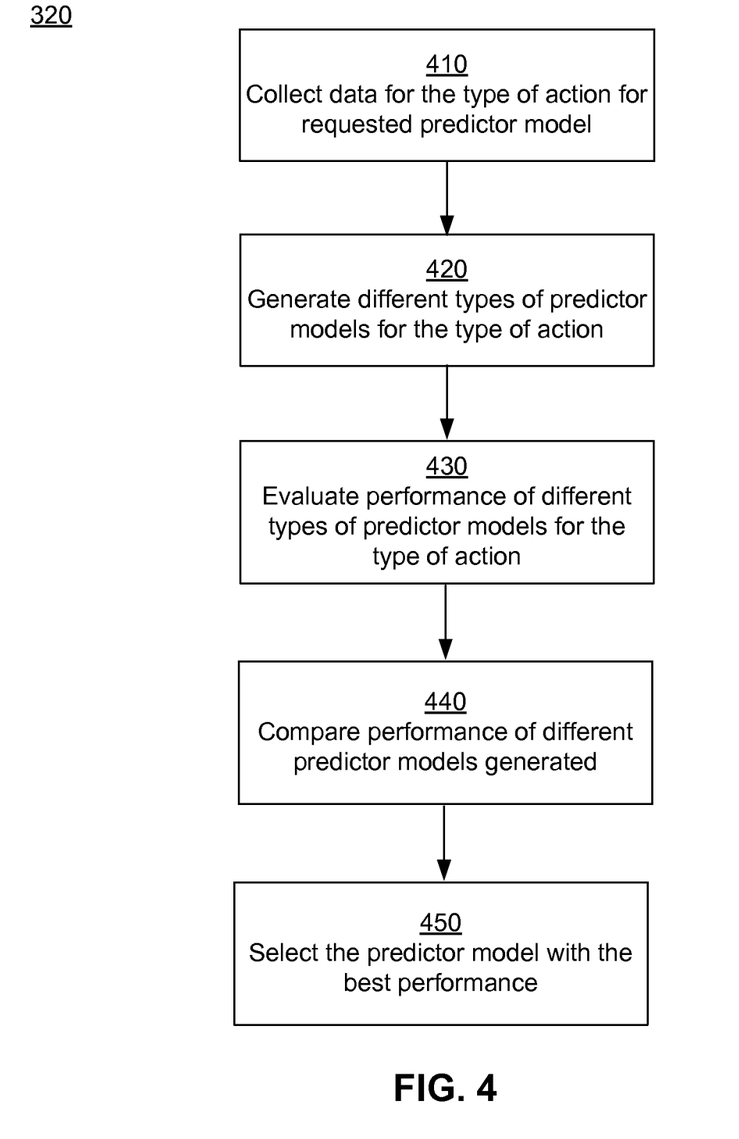
FIG. 4 illustrates the overall process for generating a predictor model for a given type of action by users, in accordance with an embodiment of the invention.

FIG. 4 shows the process of generating 320 a predictor model for a given type of action, in accordance with an embodiment of the invention. The predictor factory 150 performs these steps in response to a request to generate a predictor model for a given type of action. The predictor factory 150 uses the data generated by the data extractor 265 as training data set for training machine learning models 275. The predictor factory 150 trains different types of machine learning models and generates different predictor models for the given type of action. The predictor factory 150 determines the values of coefficients or parameters for each type of model.

The model evaluator 280 uses a portion of the data generated by the data extractor 265 as test data for evaluating 430 the different models generated. The model evaluator 280 may evaluate a given model by predicting the result in a given situation presented to a particular user by using the predictor model and then actually observing the action performed by the user in the given situation. The model evaluator 280 tracks the number of instances in which the predicted result matches the observed results and the number of instances in which the predictor model fails to predict the result accurately. The predictor models are scored based on their rate of success in predicting the results for the given type of action. For example, a predictor model for a given type of action that predicts correct result 70% of times is scored higher than a predictor model for the same type of action that predicts correct results 40% of times.

The model evaluator 280 compares 440 the performance of the different types of models for the given action to select a model for use. The model evaluator 280 selects the model based on the performance of each model. In an embodiment, the model evaluator 280 selects the predictor model that performs the best as the predictor model for the given type of action. The predictor factory 150 stores the information describing the selected predictor model and returns a handle to the predictor model to the requester. The handle for the predictor model may be used subsequently for invoking the predictor model for predicting results for actions of the given type.

Figure 5:
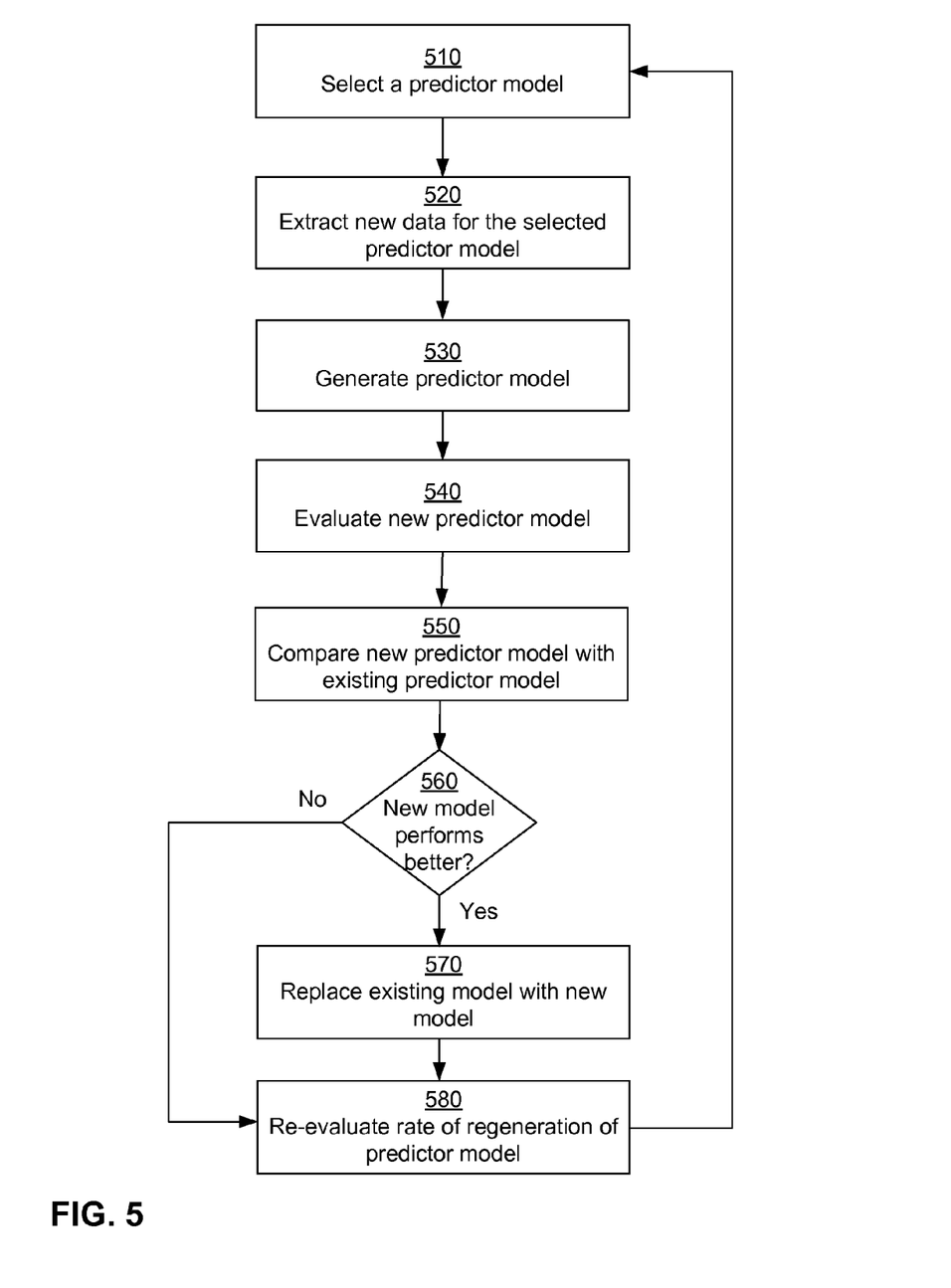
FIG. 5 is a flowchart of the process for regenerating the models and updating them in the social networking system, in accordance with one embodiment of the invention.

FIG. 5 is a flowchart of the process for regenerating the models and updating them in the social networking system, in accordance with one embodiment of the invention. As illustrated in FIG. 5, the scheduler selects 510 a predictor model for a particular type of action for regeneration and re-evaluation of the predictor model. The data extractor 265 extracts 520 the data required for regenerating a predictor model for the type of action as well evaluating and testing the model. The model generator 290 generates 530 a new predictor model for the type of action corresponding to the selected predictor model. The model evaluator 280 evaluates 540 the new model generated, for example, by taking sample data set and executing the predictor model to predict the action and comparing the predicted result with the actual action. The model evaluator 280 compares 550 the performance of the new predictor model that was generated 530 with the existing predictor model that was selected 510. The predictor models may be compared using an online A/B test comparison. The A/B test may use each model being compared in the system to see the impact of the model on the system. The impact of a model on the system may be determined using the behavior of the end user. If the new predictor model is determined 560 to perform better than the existing model, the model generator 290 replaces 570 the existing model with the new predictor model.

The data describing the predictor model in the predictor store 120 is updated to reflect the new generated predictor model. If the new predictor model performs worse than the existing model, or if the improvement in the performance of the new predictor model is below a threshold value compared to the existing model, the model generator 290 keeps the existing model and discards the new predictor model. The scheduler 285 may re-evaluate the rate at which the predictor models for the particular action are regenerated. For example, if the improvement observed in each new predictor model that is generated in each iteration of the process illustrated in FIG. 5 is consistently marginal over the previous model, the rate at which the predictor model is re-generated may be reduced. The predictor models for each type of action may be regenerated by the scheduler at a different rate. The scheduler may associate a task for regeneration of the predictor model with a timestamp and add the task to the queue. Depending on the timestamp of the next task in the queue, the scheduler may select 510 the next predictor model for regeneration or wait for certain time and check the queue again later.

Alternative Applications

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

For example, the predictor models can be generated and used in other types of online systems and are not limited to social networking systems. For example, an online system that stores user profiles and allows users to take actions can generate and user predictors for various actions that users can take. For example, an online system may allow users to receive feeds of various types of data. A predictor model may be developed for predicting whether a user is going to open a feed presented to the user. The predictor model can be used by the online system to order the feeds presented to the user, for example, the feeds may be ordered based on the likelihood that a user is going to open the feed or request additional information from the feed.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    receiving, by an online system, a plurality of requests for generating predictors, each request specifying a type of action performed by users of the online system, a category of users, and criteria for identifying a successful instance of the type of action;
    for each request associated with a type of action, generating, by the online system, a predictor for the type of action, the generating comprising:
        generating a training data set from a plurality of successful instances and failure instances of the type of action performed by online system users selected in response to belonging to the specified category of users;
        training one or more candidate predictors using the training data set, wherein each candidate predictor comprises a machine learned model;
        evaluating performance of each candidate predictor by executing each predictor on a test data set generated from an additional plurality of successful instances and failure instances of the type of action performed by online system users selected in response to belonging to the specified category of users; and
        selecting a predictor for the type of action by comparing the performance of the one or more candidate predictors; and
    returning a handle corresponding to the generated predictor to a requester of the selected predictor;
    periodically generating a new predictor by:
        comparing performance of the new predictor against performance of a previously generated predictor; and
        responsive to the performance of the new predictor exceeding the performance of the previously generated predictor, replacing the previously generated predictor with the new predictor; and
    reducing a rate of periodically generating the new predictor for the action type responsive to an improvement in the performance of the new predictor compared to the performance of the previously generated predictor being below a threshold value.

2. The computer-implemented method of claim 1, further comprising:
    receiving a request for a predictor from a process running in the online system, the request specifying a handle and an instance of user information;
    executing the predictor corresponding to the specified handle on the instance of user information; and
    returning a result of the predictor to the requesting process.

3. The computer-implemented method of claim 1, wherein a successful instance of a type of action corresponds to information stored in the online system indicating a user taking an action of the type responsive to the user being presented with a user interface that allows users to take actions of the type of action.

4. The computer-implemented method of claim 1, wherein the request further specifies criteria for a failure instance, wherein a failure instance of a type of action corresponds to information stored in the online system indicating a user's failure to take an action of the type responsive to the user being presented with information that allows the user to take action of the type of action.

5. The computer-implemented method of claim 1, wherein the request further specifies criteria for a failure instance, wherein a failure instance of a type of action corresponds to information stored in the online system indicating a user providing input indicating a dislike for information presented in a user interface associated with the type of action.

6. The computer-implemented method of claim 1, wherein each type of action is targeted to an entity represented in the online system.

7. The computer-implemented method of claim 6, wherein the entity corresponding to the type of action is one of a user of the online system, a social group, or an image.

8. The computer-implemented method of claim 1, wherein at least one of the candidate predictors is a machine learning model based on at least one of a linear regression, a logistic regression, boosting tree, or weighted decision tree.

9. A computer-implemented method comprising:
    storing, by an online system, an existing predictor for predicting whether a user of the online system performs a type of action, the existing predictor associated with criteria for determining a successful instance of the type of action;
    periodically regenerating the existing predictor by:
        identifying a data set comprising successful instances and failure instances of the type of action performed by users of the online system;
        training one or more candidate predictors using the identified data set, wherein each candidate predictor comprises a machine learned model;
        evaluating performance of each candidate predictor by executing each predictor on a test data set comprising a plurality of successful instances and a plurality of failure instances of the type of action performed by users of the online system;
        selecting a candidate predictor from the one or more candidate predictors by comparing the performance of the one or more candidate predictors;
        comparing performance of the selected candidate predictor with performance of the existing predictor; and replacing the existing predictor by the selected candidate predictor responsive to performance of the selected candidate predictor exceeding the performance of the existing predictor; and reducing a rate of periodically regenerating the existing predictor for the action type responsive to an improvement in the performance of the selected predictor compared to the performance of the existing predictor being below a threshold value.

10. The computer-implemented method of claim 9, wherein a successful instance of a type of action corresponds to information stored in the online system indicating a user taking an action of the type responsive to the user being presented with a user interface that allows users to take actions of the type of action.

11. The computer-implemented method of claim 9, wherein a failure instance of a type of action corresponds to information stored in the online system indicating a user failing to take an action of the type responsive to the user being presented with a user interface that allows users to take actions of the type of action.

12. The computer-implemented method of claim 9, wherein at least one of the candidate predictors is a machine learning model based on at least one of a linear regression, a logistic regression, boosting tree, or weighted decision tree.

13. A computer program product having a non-transitory computer-readable storage medium storing computer-executable code, the code comprising:

a predictor factory module of an online system configured to:

store an existing predictor for predicting whether a user of the online system performs a type of action, the existing predictor associated with criteria for determining a successful instance of the type of action;

periodically regenerate the existing predictor by:

identifying a data set comprising successful instances and failure instances of the type of action performed by users of the online system;

training one or more candidate predictors using the identified data set, wherein each candidate predictor comprises a machine learned model;

evaluating performance of each candidate predictor by executing each predictor on a test data set comprising a plurality of successful instances and a plurality of failure instances of the type of action performed by users of the online system;

selecting a candidate predictor from the one or more candidate predictors by comparing the performance of the one or more candidate predictors;

comparing performance of the selected candidate predictor with performance of the existing predictor; and replacing the existing predictor by the selected candidate predictor responsive to performance of the selected candidate predictor exceeding the performance of the existing predictor; and reduce a rate of periodically regenerating the existing predictor for the action type responsive to an improvement in the performance of the selected predictor compared to the performance of the existing predictor being below a threshold value.

14. The computer program product of claim 13, wherein a successful instance of a type of action corresponds to information stored in the online system indicating a user taking an action of the type responsive to the user being presented with a user interface that allows users to take actions of the type of action.

15. The computer program product of claim 13, wherein a failure instance of a type of action corresponds to information stored in the online system indicating a user failing to take an action of the type responsive to the user being presented with a user interface that allows users to take actions of the type of action.

16. The method of claim 1, wherein the online system users are users of a social networking system, wherein the type of action is based on initiating a connection to a target entity represented in the social networking system.

17. The method of claim 1, wherein the online system users are users of a social networking system, wherein the type of action is based on commenting on a target entity posted in the social networking system.

18. The method of claim 9, wherein the online system comprises a social networking system, wherein the type of action is based on at least one of initiating a connection to a target entity represented in the social networking system and commenting on a target entity posted in the social networking system.

19. The computer program product of claim 13, wherein the online system comprises a social networking system, wherein the type of action is based on at least one of initiating a connection to a target entity represented in the social networking system and commenting on a target entity posted in the social networking system.

20. The method of claim 9, wherein a failure instance of a type of action corresponds to information stored in the online system indicating a user providing input indicating a dislike for information presented in a user interface associated with the type of action.

21. The computer program product of claim 13, wherein a failure instance of a type of action corresponds to information stored in the online system indicating a user providing input indicating a dislike for information presented in a user interface associated with the type of action.

* * * * *